US005595449A

United States Patent [19]
Vitkin

[11] Patent Number: 5,595,449
[45] Date of Patent: Jan. 21, 1997

[54] INFLATABLE KEYBOARD

[75] Inventor: Lev M. Vitkin, Carmel, Ind.

[73] Assignee: Delco Electronics Corporation, Kokomo, Ind.

[21] Appl. No.: 576,823

[22] Filed: Dec. 21, 1995

[51] Int. Cl.$^6$ .............................. B41J 5/08; H03K 17/94
[52] U.S. Cl. .......................... 400/472; 400/491.1; 341/22
[58] Field of Search ................................ 400/472, 491.1, 400/491; 341/22

[56] References Cited

U.S. PATENT DOCUMENTS

| | | | |
|---|---|---|---|
| 4,597,681 | 7/1986 | Hodges | 400/488 |
| 4,661,005 | 4/1987 | Lahr | 400/489 |
| 4,739,451 | 4/1988 | Kuba | 361/394 |
| 4,795,888 | 1/1989 | MacFarlane | 235/145 R |
| 5,141,343 | 8/1992 | Roylance et al. | 400/472 |
| 5,459,461 | 10/1995 | Crowley et al. | 341/22 |

FOREIGN PATENT DOCUMENTS 2152437  8/1985  United Kingdom.

OTHER PUBLICATIONS

IBM Technical Disclosure Bulletin vol. 27 No. 4A Sep. 1984.

*Primary Examiner*—Edgar S. Burr
*Assistant Examiner*—Dave A. Ghatt
*Attorney, Agent, or Firm*—Mark A. Navarre

[57] ABSTRACT

A keyboard for data entry has a rigid portion containing a pump and a flexible inflatable portion including inflatable keys. A flexible circuit has a pair of contacts for each key which are bridged by key operation and extends through both portions to carry key operation signals to a processor in the rigid portion. A release valve permits deflation to a small size for storage and the pump effects inflation to its full size for operation.

10 Claims, 2 Drawing Sheets

INFLATABLE KEYBOARD

FIELD OF THE INVENTION

This invention relates to digital input devices and particularly to a keyboard which is inflatable for use and deflatable for storage in a small space.

BACKGROUND OF THE INVENTION

Digital electronic devices of very small size are in common use. These include wrist watches, pocket-size devices and vehicle installed devices which have electronic chips and a display, but have no room for a full-sized keyboard, if any. At best such devices which contain data bases include miniature keyboards which permit only very slow data entry. A conventional full size keyboard would be inconvenient or impractical to incorporate as an accessory to the small digital device. It is thus desirable to provide a data entry device which is both small or compact for convenient storage and which also allows quick and easy entry of commands or data.

SUMMARY OF THE INVENTION

It is therefore an object of the invention to afford an input device for a digital electronic device which is compact for storage purposes and large enough for convenient data entry.

An inflatable keyboard is sufficiently large for normal manual operation when inflated and small enough to fold or roll into a small package when deflated. The keyboard may be only a numeric keypad or a full alpha-numeric layout. The keyboard has a rigid portion attached to a flexible air inflatable portion. The rigid portion includes a hand pump for inflation of the flexible portion, a valve for air release, and electronic chips for processing keyboard signals. The flexible portion contains keys which are substantially full-size and well spaced for easy manipulation, a pressure chamber which, when inflated, provides a firm base for the keyboard, and a flexible circuit which extends into the rigid portion and carries the electronic chips. The flexible circuit has a pair of contacts at each key site which signal a key actuation to the electronic chips.

The keys comprise two main parts, a membrane slightly spaced from the flexible circuit with a conductor element for each key which is positioned to selectively bridge a pair of contacts on the flexible circuit, and a key matrix having a domed pad for each key. Each pad seals at its perimeter to a region of the membrane to define an enclosed air cell such that when a pad is depressed the associated membrane region will be deflected to bridge its conductor element across corresponding pairs of contacts. Valves couple the cells to the chamber to permit inflation of the cells when the chamber is pressurized, and a bleed hole in the valve permits deflation of the cells when pressure is released from the keyboard.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
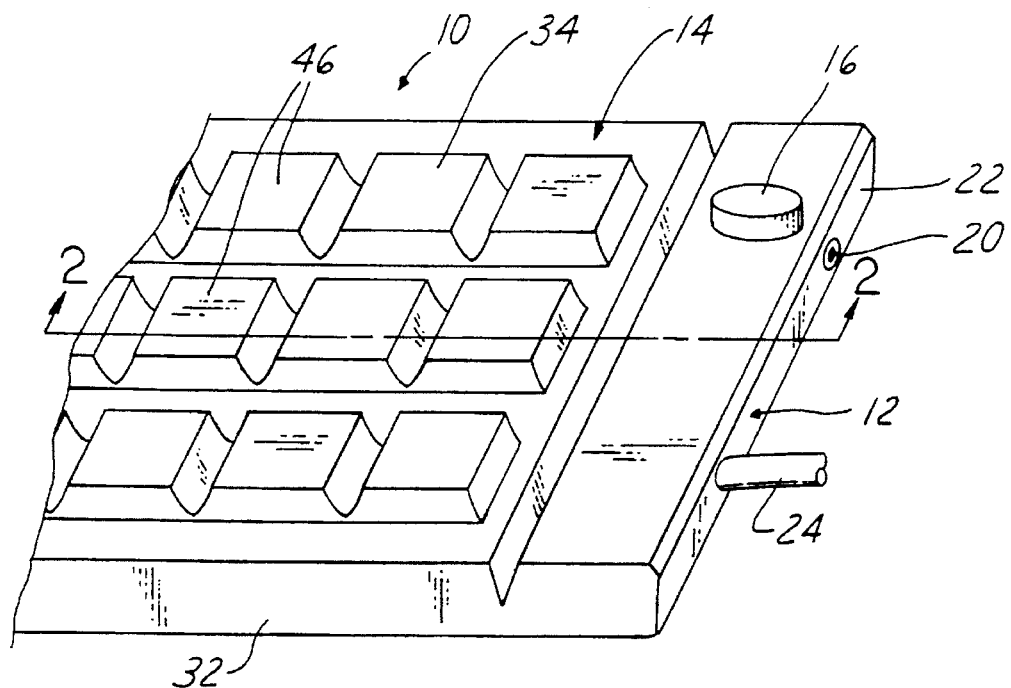
FIG. 1 is a partial isometric view of an inflatable keyboard according to the invention.
Figure 2:
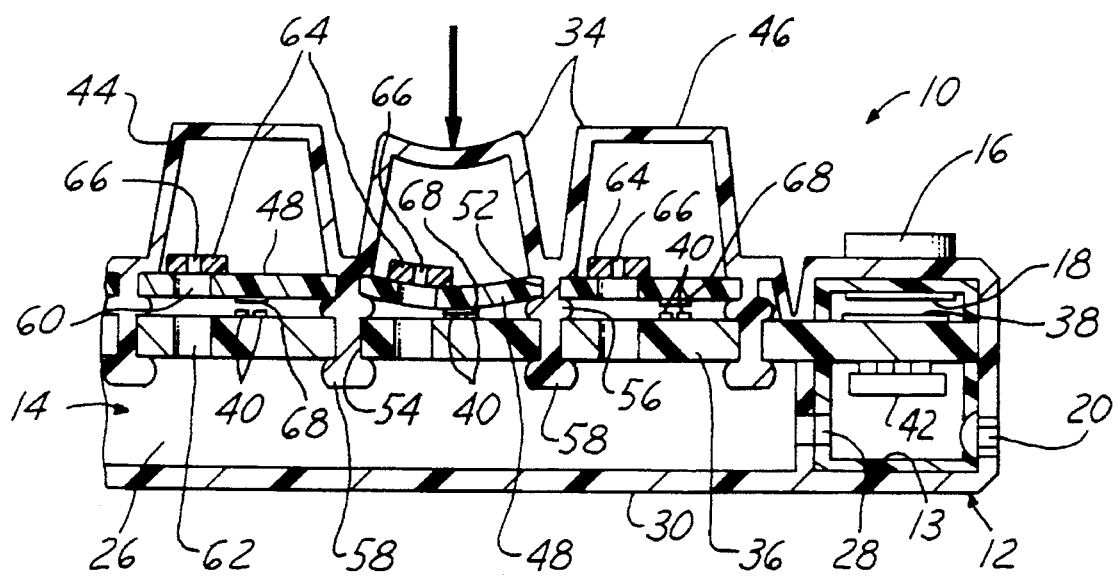
FIG. 2 is cross section of the keyboard taken along line 2—2 of FIG. 1.

Referring to FIGS. 1 and 2, a keyboard 10 comprises a small rigid housing 12 and an inflatable flexible housing 14. A portion of the flexible housing at least partially surrounds a rigid core 13 to form the rigid housing 12. A manually operable actuator 16 for a hand pump 18 extends above the surface of the housing 12, and a release valve 20 is mounted in an end wall 22. An output cable 24 also extends from the housing 12. A pressure chamber 26, pressurized by operation of the hand pump 18, resides in the rigid housing 12 and extends through an opening 28 into the flexible housing 14.

The inflatable flexible housing 14 has a bottom wall 30 and sides walls 32. A flexible key array 34, defining individual key sites, comprises the top wall of the pressure chamber. A flexible circuit 36 in the chamber 26 extends through both housings 12 and 14; in the flexible housing it lies between the bottom wall 30 and the key array 34. Conductor traces 38 on the flexible circuit 36 afford a pair of contacts 40 at the site of each key and couples the contacts to an electronic keyboard processor chip 42 mounted on the circuit 36 within the rigid housing 12.

The key array 34 includes a key matrix 44 having a plurality of domed pads 46, one at each key site, fastened to a membrane 48 which is coextensive with the key array and also fastened to the flexible circuit 36. Each pad on the key matrix seals around its periphery against the membrane to form air cells beneath each pad 46. Legs 50 extend down from the key matrix at each end of each key row and at the juncture of adjacent pads in each row. The legs 50 protrude through slots 52 and 54 in the membrane 48 and the flexible circuit 36, respectively. A ridge 56 in each leg 50 serves as a spacer between the flexible circuit 36 and the membrane 48, and also helps seal the slots 52 to prevent air leakage from the cells. An enlargement 58 on the end of each leg holds the leg against slipping from the slot 54 in the flexible circuit 36.

Figure 3:
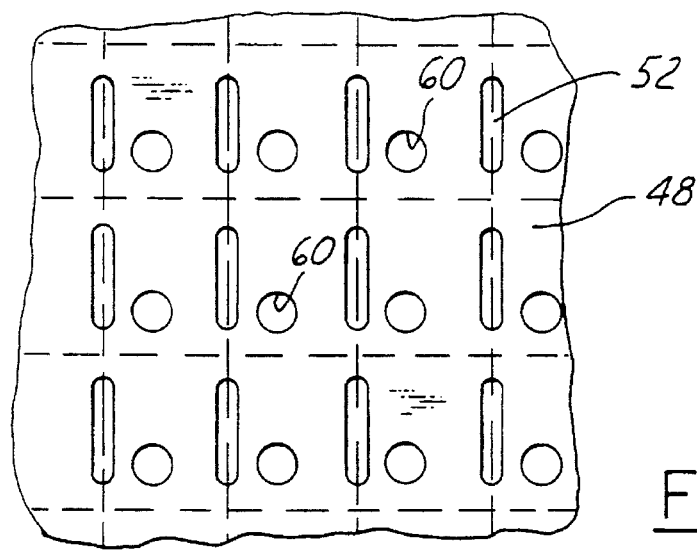
FIG. 3 is a top view of a membrane used in the keyboard.
Figure 4:
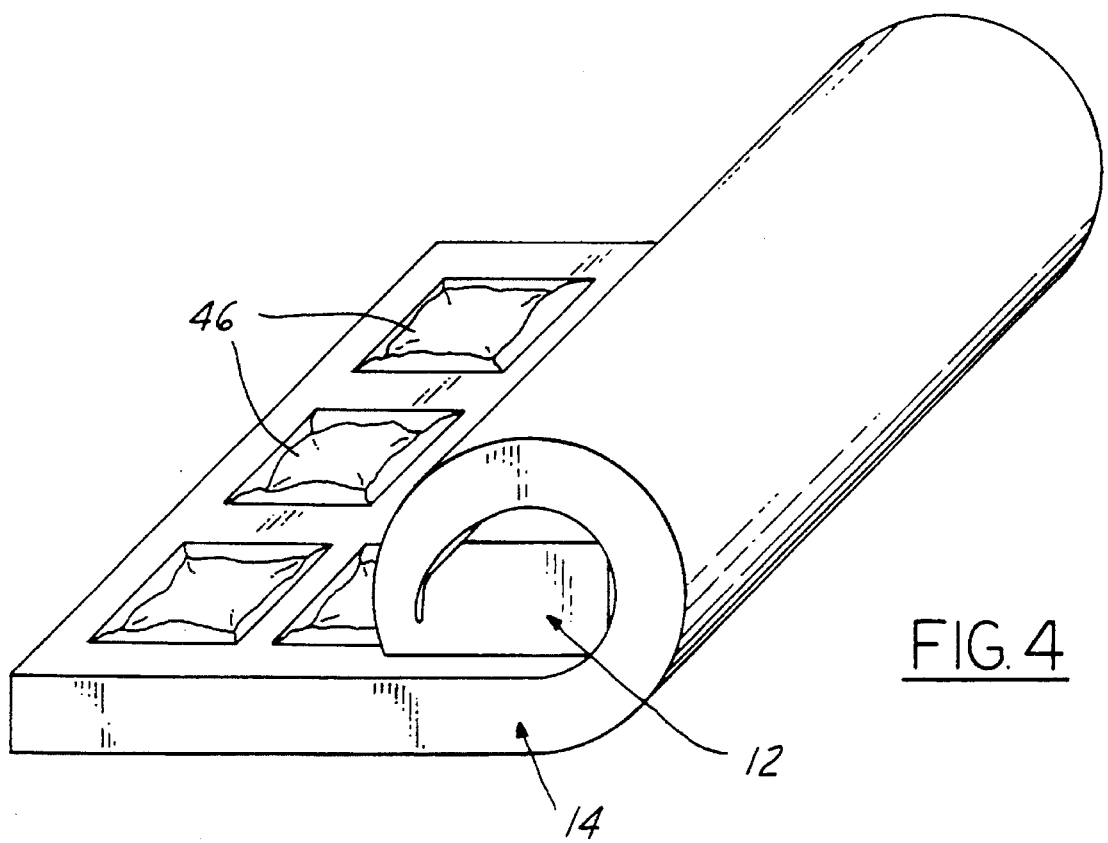
FIG. 4 is an isometric view of the keyboard in deflated state and partially rolled up according to the invention.

The membrane 48, as shown in FIG. 3, has a valve opening 60 at each key site as well as the slots 52. The flexible circuit 36 has a passage 62 aligned with each valve opening 60 to admit air to the space between the membrane and the flexible circuit as well as to the air cells within the domed pads via the openings 60 to inflate the air cells when the keyboard is inflated. Flap valves 64 on the upper surface of the membrane 48 cover the valve openings 60 to impede free escape of air from the air cells, but a small bleed hole 66 in each flap valve permits slow air escape. When the keyboard is deflated by opening the release valve 20, and the flexible housing is folded or rolled, the air is forced out of the air cells and bleeds through the holes 66 to deflate the domed pads 46, as shown in FIG. 4. The bottom surface of the membrane carries a conductive foil coupon 68 at each key site in registry with and normally spaced from each pair of contacts 40.

In operation, the keyboard is inflated by operating the hand pump actuator 16. As pressure builds in the chamber 26, each valve 64 opens to freely admit air to the air cells beneath the domed pads 46. When a pad of the keyboard is tapped to enter a digit or character as indicated by the arrow in FIG. 2, the pad is slightly depressed, increasing the pressure in the air cell and causing the membrane beneath the pad to bulge down against the flexible circuit. The conductive coupon 68 then bridges the corresponding pair of contacts 40 to signal the key operation to the circuit 42. The brief pad depression does not cause significant loss of air through the bleed hole 66; even if significant amount of air is lost, causing a pressure deficit when the pad is released, the flap valve will open to quickly equalize the pressure of the air cell with that of the pressure chamber 26.

It will thus be seen that the inflatable keyboard can be stored in a small spaced and inflated to a large size and operated by typing on the keys in the normal manner, thus allowing rapid data entry. The keyboard can be deflated to its previous small size by opening the release valve and folding or rolling the flexible portion.

The embodiments of the invention in which an exclusive property or privilege is claimed are defined as follows:

1. An inflatable keyboard comprising:

a housing having a rigid portion and a flexible portion;

the flexible portion having a chamber coupled to the rigid portion and extending substantially over the area of the keyboard;

a pump in the rigid portion for inflating the chamber to afford a firm keyboard base;

a valve in the housing for releasing pressure from the chamber to deflate the flexible portion for storage;

a flexible circuit extending along the area of the keyboard and carrying a plurality of conductors; and a flexible array of keys adjacent the flexible circuit for selectively contacting the conductors to signal key actuation.

2. The invention as defined in claim 1 wherein the flexible array of keys includes a membrane spaced from the flexible circuit and carrying conductive means for bridging a pair of conductors upon key actuation.

3. The invention as defined in claim 1 wherein the flexible array of keys includes:

a membrane spaced from the flexible circuit and carrying conductive means for each key for bridging a pair of conductors upon key actuation;

a molded key matrix covering the membrane for defining key positions and responsive to manual actuation for urging the membrane against the flexible circuit in local regions corresponding to the key positions.

4. The invention as defined in claim 1 wherein the flexible array of keys includes:

a membrane spaced from the flexible circuit and carrying conductive means for each key for bridging a pair of conductors upon key actuation;

a molded key matrix covering the membrane and comprising a plurality of pads for manual actuation, each pad defining a key position; and each pad having a periphery engaging a portion of the membrane to define an enclosed air cell such that depression of a pad causes the membrane portion to bulge against the corresponding pair of conductors.

5. The invention as defined in claim 4 wherein:

passages in the flexible circuit connect one side of each membrane portion to the chamber;

each membrane portion has a valve for admitting air to the air cell upon inflation.

6. The invention as defined in claim 4 wherein:

passages in the flexible circuit connect one side of each membrane portion to the chamber;

each membrane portion has a key valve for admitting air from the chamber to the cell upon inflation of the flexible portion; and an aperture for bleeding air from each cell to the chamber upon deflation of the flexible portion.

7. The invention as defined in claim 6 wherein each key valve is a flap valve covering a hole in the membrane, and the air bleed aperture is in the flap valve.

8. The invention as defined in claim 1 wherein the pump includes a manually operable actuator for operating the pump.

9. The invention as defined in claim 1 wherein the flexible circuit carries electronic circuitry in the rigid portion for processing signals.

10. The invention as defined in claim 1 wherein the flexible array of keys includes a membrane spaced from the flexible circuit and carrying conductive means for bridging a pair of conductors upon key actuation, and a molded key matrix covering the membrane for defining key positions;

slots in the flexible circuit and the membrane adjacent each key position; and legs depending from the molded key matrix and extending through the slots for connecting the key matrix and the membrane to the flexible circuit.

* * * * *